March 25, 1958 R. A. LAMBERTSON 2,828,019
AQUARIUM CLEANING DEVICE
Filed Jan. 7, 1955 2 Sheets-Sheet 1
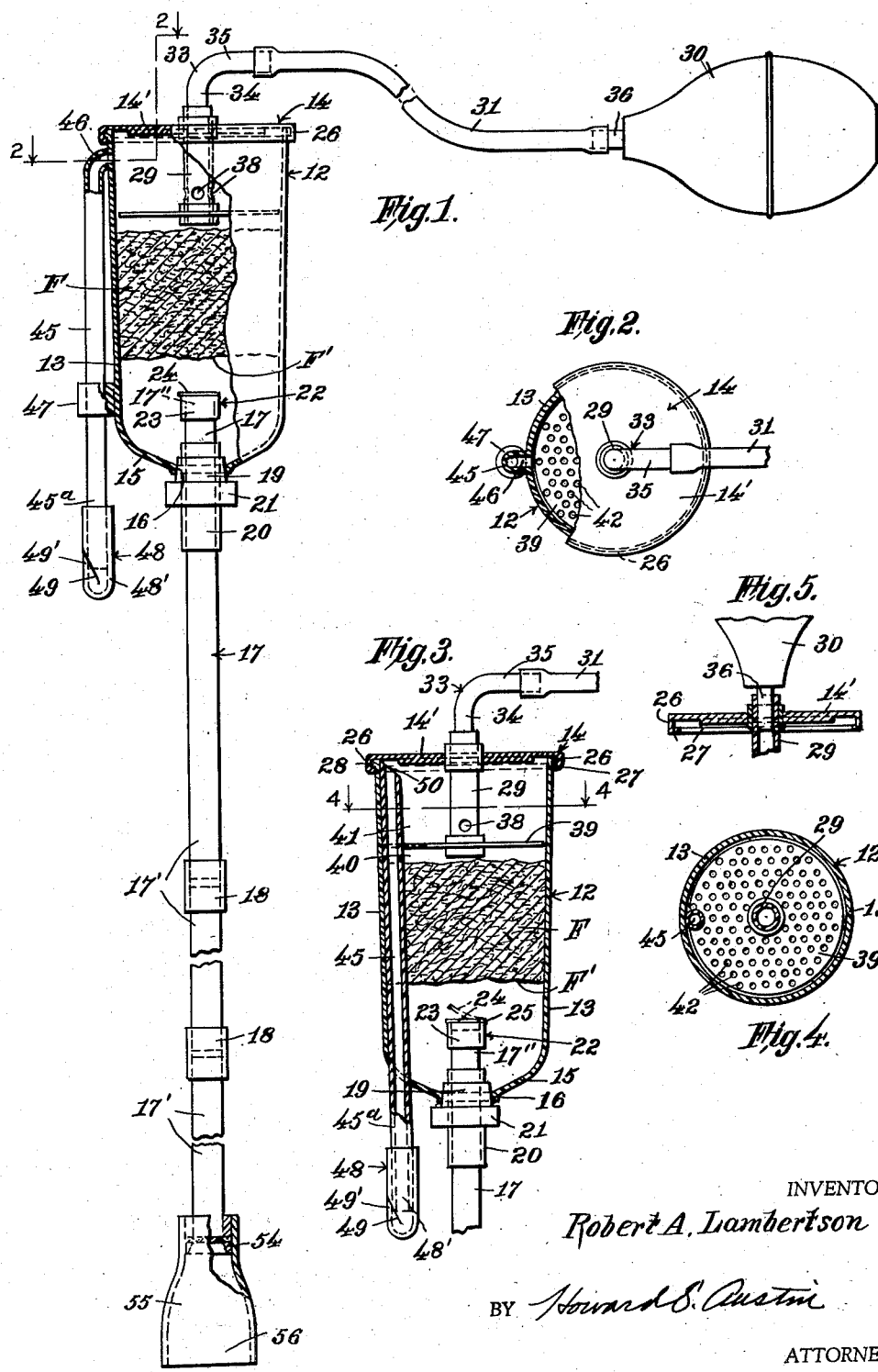
INVENTOR
Robert A. Lambertson
BY Howard S. Austin
ATTORNEY March 25, 1958  R. A. LAMBERTSON  2,828,019
AQUARIUM CLEANING DEVICE
Filed Jan. 7, 1955  2 Sheets-Sheet 2
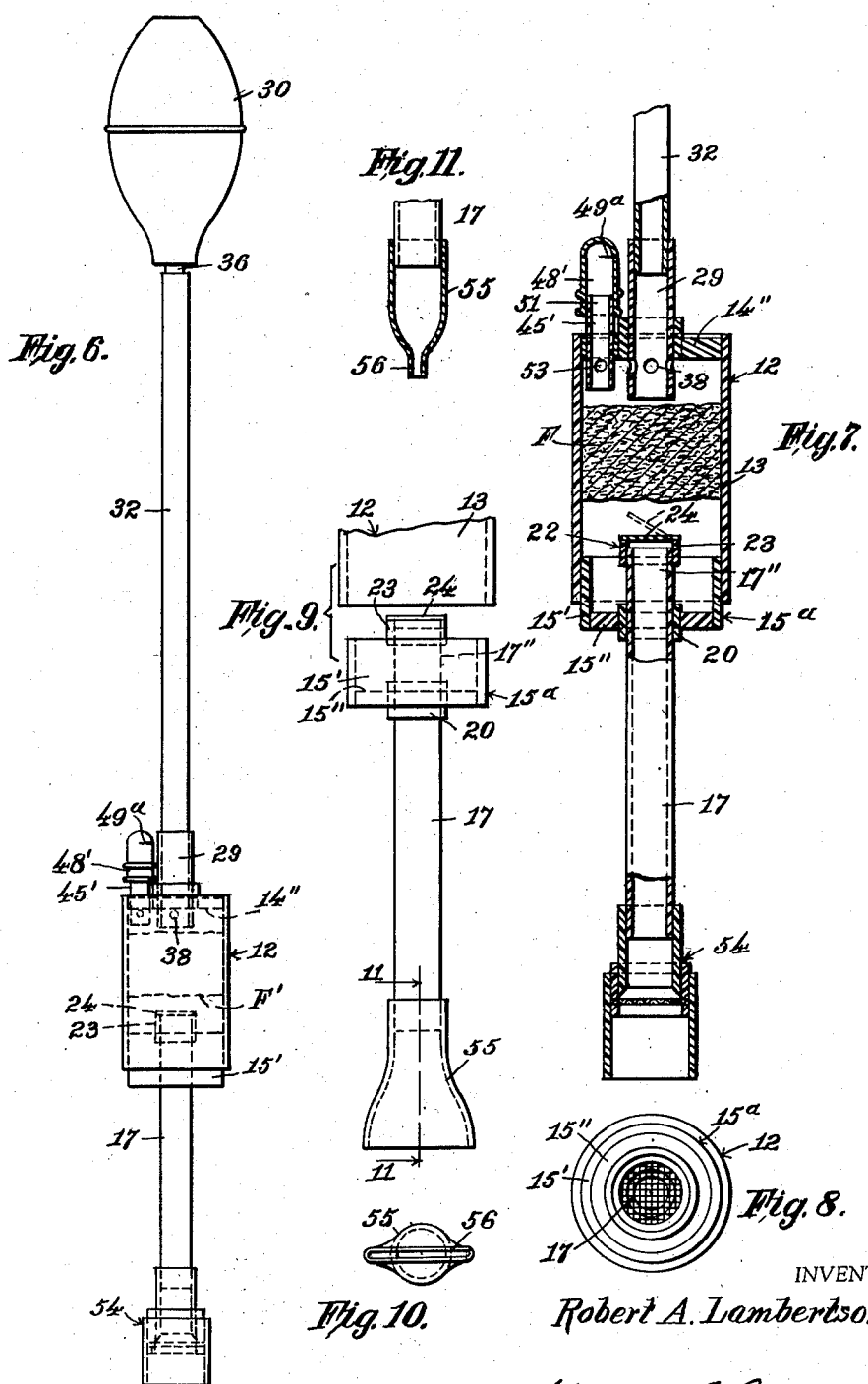
INVENTOR
Robert A. Lambertson
BY Howard S. Austin
ATTORNEY

United States Patent Office 2,828,019
Patented Mar. 25, 1958

2,828,019

AQUARIUM CLEANING DEVICE

Robert A. Lambertson, Winston-Salem, N. C.

Application January 7, 1955, Serial No. 480,338

12 Claims. (Cl. 210—169)

This invention relates to aquarium cleaning devices, that is to devices adapted for use in cleaning the dirt and sediment from the top of, and/or from in and under the sand or gravel in the bottom of aquaria; and also for removing dead leaves, small snails, or other undesirable matter.

An object of the present invention is to provide a device for the purpose stated which may be readily manipulated, and without appreciable or undue agitation of the water in the aquarium.

A further object of the invention is to provide a cleaning device as stated which may be readily operated in close quarters without the necessity of moving the aquarium to a more open space.

A further object of the invention is to provide a device as above stated, in which the inlet valve will permit passage into the housing of the device, of any article no larger than the internal diameter of the valve without clogging the valve; and of such construction that such articles or article may be readily removed from the housing.

A further object of the invention is to provide a device as stated comprising a housing equipped with an inlet valve and an outlet valve, in which said valves will offer but slight resistance to the flow of water therethrough.

A further object of the invention is to provide a device of the class stated through which the water is pumped by a succession of alternate suction and discharge impulses, and in which the discharge impulses will return the water, when filtered, to the aquarium, and at the same time will dislodge from the filter material a large portion of the impurities that have been removed from the water, thereby materially lengthening the effective life of the filter material, and also maintain a more constant and uniform flow through the device.

Other objects will appear hereinafter.

With the above objects in view, the invention consists generally in a housing adapted to contain a transverse layer of fibrous filter material, such as glass wool, spaced from the ends of said housing, an inlet tube extending downwardly from the lower end of said housing, an exhaust tube for returning the filtered water from the upper end of said housing, and a flexible bulb communicating with the upper end of said housing for exerting a succession of alternate suction and compression impulses in the upper end of said housing.

The invention further consists in a housing having upper and lower end members, said housing being adapted to contain a transverse layer of filter material spaced from said end members, an inlet tube extending downwardly from said lower end member the upper end of said inlet tube terminating below and spaced from the lower face of said filter material, a one-way inlet flap valve on the upper end of said tube, a discharge tube communicating with the housing above said filter material, a one-way discharge valve on the discharge end of said discharge tube, a flexible bulb and a tube connecting said bulb to said housing above said filter material, by which construction manipulation of said bulb will draw water and the substances to be removed from the aquarium, into the lower portion of said housing, and the filtered water returned to the aquarium through said discharge valve.

The invention further consists in providing a removable mounting for connecting the inlet tube to the lower end of the housing, whereby the removal thereof will permit the matter filtered from the water, and the larger articles which have been extracted from the aquarium, to be readily removed from the housing.

The invention further consists in various details of construction and arrangements of parts as will be described hereinafter and particularly pointed out in the claims.

The invention will be more readily understood by reference to the accompanying drawings, in which:

Fig. 1 is an elevation of an aquarium cleaning device embodying the invention, parts thereof being illustrated in section;

Fig. 2 is a top plan view of the same, a portion thereof being shown in section taken on the line 2—2 of Fig. 1;

Fig. 3 is a vertical sectional view illustrating a modified arrangement of the discharge tube;

Fig. 4 is a horizontal section on the line 4—4 of Fig. 3;

Fig. 5 is a detail view illustrating the manner of connecting the bulb directly to the housing;

Fig. 6 is an elevation of a further modification of the invention particularly adapted for use with small aquaria;

Fig. 7 is a vertical section of the housing and inlet, illustrated upon an enlarged scale;

Fig. 8 is a bottom plan view of the same;

Fig. 9 is a detail side elevation of the lower portion of the device illustrating the manner in which the housing may be opened at the bottom for removal of large particles, and for cleaning;

Fig. 10 is a bottom plan view of an attachment for the lower end of the inlet tube to prevent large articles from entering when it is desired to exclude the same; and Fig. 11 is a detail section on the line 11—11 of Fig. 9.

The form of the invention as illustrated in Figs. 6 to 9 inclusive is preferable when cleaning the smaller sizes of aquaria; and the housing is usually entirely submerged in the water of the aquarium; whereas the form shown in Figs. 1 to 5 inclusive is preferable for cleaning aquaria of larger sizes, and the housing is usually only partly submerged, or may not be submerged to any extent.

Referring to the drawings, 12 indicates the housing comprising a side wall 13 which is preferably circular in cross section, a top closure 14, and a bottom 15. The housing 12 may be slightly tapered downwardly, as illustrated in Figs. 1 to 4 of the drawings; or it may be cylindrical as shown in Figs. 6 to 9. The housing 12 is adapted to contain a transverse layer of filtering material F, such as glass wool, which is arranged intermediate the top 14 and bottom 15, of the housing.

In the form illustrated in Figs. 1 to 5, the bottom portion 15 is formed integrally with the side wall 13, and is dished or funnel shaped, and provided with a centrally disposed opening 16 to receive the upper end portion of an inlet tube 17. The inlet tube 17 is a sufficient length to reach from the housing 12 to the bottom of the aquarium; and may be formed of a plurality of sections 17' detachably connected by means of sleeves 18, by which construction the length of the inlet tube may be varied to suit the particular aquarium with which the device is to be used. A tapered collar 19 is provided on the inlet tube 17 adjacent the upper end thereof, and fits within the opening 16, whereby said tube may be detachably secured to the bottom of the housing and also constituting a removable closure for the bottom of said housing; and a reenforcing sleeve 20 may be interposed between the collar 19 and tube 17. A peripheral flange 21 is preferably provided on the tapered collar 19 to provide means to facilitate removing the collar and tube when it is desired to remove articles and the accumulated filth from the bottom of the housing, and for thereafter replacing the tube.

In the form illustrated in Figs. 6, 7 and 8, the inlet tube 17 is permanently fixed to the bottom element 15ª of the housing, and said bottom element is removable from the housing, as indicated in Fig. 9, for the removal of articles which may have been drawn from the aquarium and into the housing through the inlet tube. Said bottom element comprises a cylindrical outer wall 15' which fits snugly but removably within the lower end of the housing wall 13, and a transverse bottom wall 15" in which the upper portion of the tube 17 and sleeve 20 are mounted. This construction also provides access to the interior of the housing for cleaning, and for renewal of the filtering material when necessary.

The upper end 17" of the inlet tube 17, in both forms of the invention, extends a short distance above the upper end of sleeve 20 and is provided with a one-way inlet valve 22, which preferably comprises an elastic sleeve 23 mounted on said end, and a flap valve 24 connected at one side thereof to the upper edge of the sleeve, as at 25. Said valve is formed of flexible material, preferably rubber. It should be noted that the filter material is positioned in the housing 12 so that the lower face F' thereof is at an ample distance above the valve as not to interfere with the free functioning of the same.

As illustrated in Figs. 1 to 5 inclusive, the closure 14 for the upper end of the housing 12 comprises a flexible plastic disc 14' provided with a depending peripheral rim 26 upon the lower edge of which is an inturned flange 27 which engages under a peripheral bead 28 on the upper edge of the wall 11. This construction provides a removable air-tight closure for the housing. In the smaller form of the device illustrated in Figs. 6 to 8 inclusive, the closure for the upper end of the housing consists of an inflexible disc 14" fixedly mounted in the upper end of the housing.

Fixed, preferably axially, in the closure member 14' or 14" is a short tube 29 to which is connected a flexible bulb 30 for actuating the device. The bulb may be connected directly to the upper end of tube 29; or it may be connected thereto by means of a flexible tube 31 as illustrated in Fig. 1; or by a rigid tube 32, as illustrated in Figs. 6 and 7. Frequently, an aquarium is located beneath an overhanging shelf or other object, with but a few inches of clearance, between the same and the top of the aquarium. Under such circumstances an elbow tube 33 is provided, with one leg 34 thereof extending vertically into the upper end of tube 29, and the flexible tube 31 is connected to the horizontal leg 35 thereof; a short tubular nipple 36 on the bulb 30 being inserted in the outer end of the tube 29. Where there is no overhead interference, the nipple 36 may be inserted directly into the upper end of tube 29, as shown in Fig. 5, if preferred. Either arrangement may be used to suit the convenience and comfort of the user. In the smaller type of the device, the nipple 36 is inserted in the upper end of the rigid tube 32.

The tube 29 extends downwardly into the housing 10, and is provided with a lateral vent or vents 38 located above the lower end thereof and beneath the closure 12. In the larger form of the device, as illustrated in Figs. 1 to 5, a foraminate disc 39 is preferably fixed to the lower portion of tube 29, which divides the housing into a lower or filter chamber 40, and an upper or filtered water chamber 41 to receive the filtered water before the same is returned to the aquarium. The disc 39 is provided with a plurality of perforations 42 permitting the filtered water to freely enter the upper portion of the housing, and the disc prevents the filter material from interfering with the free discharge of the filtered water. In the smaller form of the device the disc 39 is unnecessary.

Communicating with the upper portion of the housing 12 is a discharge tube 45 for the filtered water. In the form illustrated in Figs. 1 and 2, said tube 45 is arranged substantially vertically and exteriorly of the housing 12, with the upper end 46 thereof bent inwardly and opening into said housing directly below the closure 14. A sleeve 47 fixed to the lower portion of the housing provides a brace for said tube. The lower end 45ª of the tube 45 preferably terminates below the level of the bottom of the housing, and hence below the water level in the aquarium when the housing is but slightly above or partly submerged in water; and said lower end is provided with a one-way directional discharge valve 48 which comprises a rubber nipple 48' having a diagonally disposed cut 49 forming an upwardly extending flap 49' which directs the discharged water upwardly toward the surface of the water thereby avoiding turbulence at the bottom of the aquarium which would cause the dirt to circuit in the aquarium and not be sucked up by the device. In Figs. 3 and 4 is illustrated a modification, wherein the tube 45 is arranged inside of the housing and attached to the inner face of the wall 11. The upper end of the tube terminates in a beveled end 50, arranged directly below the closure 14, to permit the filtered water to enter; and the lower portion 45ª of the tube projects through the bottom wall 15 of the housing.

As the device is moved about in the aquarium when in use, the relative position of the same with relation to the water-line will constantly vary; therefore such waterline is not shown in the drawings. It is to be understood that the valve 48 is preferably maintained below the water level although this is not necessary.

In using the smaller form (Figs. 6 to 9), the entire housing is submerged well below the water level. The discharge tube 45' extends vertically through the top closure 14", the upper end 51 thereof terminating a short distance above said closure, and equipped with the discharge valve 48'. Said valve 48' comprises a nipple provided with a lateral cut 49ª which preferably directs the jets of discharged water toward the tube 29, and not downwardly, thereby avoiding turbulence in the water of the aquarium. The lower end 52 of the tube 45' is provided with a lateral inlet aperture 53 directly below the closure 14".

Under some conditions it may be desirable to provide means to limit the size of the articles entering the inlet tube 17. To this end a screen element 54 may be attached to the lower end of the inlet tube 17, as shown in Figs. 1 and 6, and illustrated in detail in Figs. 7 and 8. If preferred, a tubular tip 55 having a flattened end 56 may be attached to the end of the inlet tube 17, either directly thereto as indicated in Fig. 9, or as part of the screen element as shown in Fig. 1.

The operation of the device, in the form illustrated in Figs. 1 to 5 of the drawings, is as follows: After the device is positioned within the aquarium, the bulb 30 is squeezed, and upon release will suck air out of the housing, and water will enter to the volume of air sucked into the bulb. Again squeezing the bulb will force the air out through valve 48. Subsequent squeezing and releasing of the bulb will evacuate all air from the housing with the exception of the small amount between the top closure 12 and the upper surface of end 46 of the discharge tube 45 where it joints the housing. The end of tube 29 and the vents 38 therein will then be submerged in the water in the housing, and further operation of the bulb 30 will suck and discharge only water. Water sucked up through the filter material F will leave the dirt against the under face F' of said filter, and the downward pressure of the water upon each squeezing of the bulb 30 will tend to discharge the particles of dirt from the filter, thereby maintaining an undiminished flow of water through the filter and also lengthening the period of usefulness of the material. The filtered water will be forced through tube 45 and back into the aquarium through the valve 48; and with the form of valve illustrated and described, the jets of water issuing from the valve will be directed toward the surface of the water in the aquarium or away from the bottom, and will not agitate and soil the water. The operation of the modified form illustrated in Figs. 6 to 8 is practically the same as above described in regard to the form shown in Figs. 1 to 5; and needs no further description.

I claim:

1. In a unitary portable and manually operable device of the class described, a housing adapted to contain a transverse layer of filter material, an inlet tube extending downwardly from said housing, the upper end of said tube terminating below the lower face of said filter material, a one-way inlet valve on the upper end of said tube, a discharge tube communicating with the housing above said filter material, a one way discharge valve on the discharge end of said discharge tube, and means communicating with the upper portion of said housing for imparting a succession of alternate suction and compression impulses therein.

2. In a unitary portable and manually operable device of the class described, a housing adapted to contain a transverse layer of filter material, an inlet tube, an inlet valve on the upper end of said tube, a mounting on the upper portion of said tube below said valve for detachably connecting said tube to the lower portion of said housing, an outlet tube communicating with the upper portion of said housing above said filter material, an outlet valve on the end of said tube, and means communicating with the upper portion of said housing for exerting a succession of alternate suction and compression impulses therein.

3. In a device of the class described, a housing comprising a substantially cylindrical side wall and upper and lower end members, said housing adapted to contain a transverse layer of fibrous filter material spaced from said end members, an inlet tube extending downwardly from said lower end member, the upper end of said inlet tube extending into said housing and terminating below the lower face of said filter material, a one-way inlet valve on the upper end of said tube, a discharge tube communicating with the upper portion of said housing above said filter material, a one-way discharge valve on the end of said discharge tube, a flexible bulb, and a tube fixed at one end to said bulb, and the opposite end of said tube communicating with said housing above said filter material.

4. A device as set forth in claim 3 in which said tube connecting said bulb to said housing is flexible.

5. In a unitary portable and manually operable device of the class described, a housing adapted to contain a transverse layer of filter material, an inlet tube extending downwardly from said housing, the upper end of said tube terminating in said housing below the lower face of said filter material, an inlet valve on said upper end, said valve comprising an elastic sleeve encompassing said end and a flexible disc fixed to said sleeve at one point in the upper edge thereof, an exhaust tube communicating with said housing above the filter material, a one way valve on the outer end of said tube, and means for imparting a succession of alternate suction and compression impulses in the upper end of said housing.

6. A device as set forth in claim 5 in which said valve on said exhaust tube comprises a nipple enclosing the discharge end thereof, said nipple having a discharge slit therein for directing the jets of water issuing therefrom in a direction away from the bottom of the aquarium.

7. In a unitary portable and manually operable device of the class described, a housing comprising a side wall, a top closure and a bottom, a transverse layer of filter material in said housing and spaced from said top and bottom, an inlet tube extending upwardly through said bottom and terminating below said filter material, a one-way inlet valve on the end of said inlet tube within said housing, a discharge tube communicating with the upper end of said housing below said top closure, a one-way exhaust valve on the discharge end of said tube, a tube extending downwardly through said top closure, a foraminate disc fixed to the end of the last said tube within said housing and above said filter material, a vent in said tube between said closure and said disc, and means connected to the outer end of said tube for imparting a succession of alternate suction and compression impulses in said housing.

8. A unitary portable and manually operable aquarium cleaning device comprising a housing, a top closure and a bottom closure for said housing, a transverse layer of fibrous filter material intermediate said closures and spaced therefrom, an inlet tube extending downwardly from said bottom closure and rigidly connected thereto, the upper end of said inlet tube extending into said housing and terminating below said filter material, a one-way inlet valve on said upper end, an air-supply tube fixed in said top closure with the lower end thereof terminating above said filter material, and provided with a lateral vent, a flexible bulb connected in communication with the last said tube, a discharge tube extending from the upper portion of said housing and a one-way valve in said discharge tube.

9. A device as set forth in claim 8 wherein said inlet tube comprises a plurality of sections detachably connected.

10. A device as set forth in claim 8 in which said bottom closure, and the inlet tube fixedly connected thereto are removably mounted in the lower end of said housing.

11. In a device of the class described, a vertically disposed housing, a top closure for said housing and a bottom closure, said closures being removably secured in position, a transverse layer of fibrous filter material intermediate said top and bottom closures and spaced therefrom, a rigid inlet tube extending downwardly from said bottom closure, the upper end of said inlet tube terminating in spaced relation from the bottom face of said filter material, and a one way inlet valve on the upper end of said inlet tube, a discharge tube extending from the upper portion of said housing, an air tube extending through said top closure, lateral vents in said tube below said top closure, and a flexible tube and air pressure bulb connected to the outer end of said air tube.

12. A device as set forth in claim 11, further characterized by a foraminate disc fixed to the lower portion of said air tube within said housing and below said lateral vents.

References Cited in the file of this patent

UNITED STATES PATENTS

| | | |
|---|---|---|
| 32,815 | Arnold | July 16, 1861 |
| 546,883 | Gunther | Sept. 24, 1895 |
| 2,065,658 | Compton | Dec. 29, 1936 |
| 2,510,427 | Soncie | June 6, 1950 |
| 2,636,308 | Demmer | Apr. 28, 1953 |
| 2,672,987 | Hutchinson | Mar. 23, 1954 |
| 2,674,574 | Pettas | Apr. 6, 1954 |

FOREIGN PATENTS

| | | |
|---|---|---|
| 644,693 | Great Britain | Oct. 18, 1950 |
| 708,284 | Great Britain | May 5, 1954 |